United States Patent
Chandrasekaran et al.

(10) Patent No.: US 9,388,728 B2
(45) Date of Patent: Jul. 12, 2016

(54) SYSTEMS AND METHODS FOR NO$_x$ SENSOR DIAGNOSTICS

(71) Applicant: Cummins Emission Solutions, Inc., Columbus, IN (US)

(72) Inventors: Archana Chandrasekaran, Columbus, IN (US); Xiao Lin, Indianapolis, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 151 days.

(21) Appl. No.: 13/914,057

(22) Filed: Jun. 10, 2013

(65) Prior Publication Data

US 2014/0360166 A1    Dec. 11, 2014

(51) Int. Cl.
| | |
|---|---|
| *F01N 11/00* | (2006.01) |
| *F01N 3/20* | (2006.01) |
| *F02D 41/14* | (2006.01) |
| *F02D 41/22* | (2006.01) |

(52) U.S. Cl.
CPC ............... *F01N 11/00* (2013.01); *F01N 3/208* (2013.01); *F02D 41/146* (2013.01); *F02D 41/1463* (2013.01); *F02D 41/1465* (2013.01); *F02D 41/222* (2013.01); *F01N 2560/026* (2013.01); *F01N 2900/0416* (2013.01); *Y02T 10/24* (2013.01); *Y02T 10/40* (2013.01); *Y02T 10/47* (2013.01)

(58) Field of Classification Search
CPC ..... F01N 11/007; F01N 3/2066; F01N 3/208; F01N 2560/026; F01N 2900/0416; F02D 41/1463; F02D 41/1465; F02D 41/222; Y02T 10/24; Y02T 10/40; Y02T 10/47
See application file for complete search history.

(56) References Cited

U.S. PATENT DOCUMENTS

| | | | |
|---|---|---|---|
| 6,003,307 | A | 12/1999 | Naber et al. |
| 6,925,796 | B2 | 8/2005 | Nieuwstadt et al. |
| 7,073,320 | B2 | 7/2006 | Moritsugu et al. |
| 7,581,390 | B2 * | 9/2009 | Andrews ................. F01N 11/00 204/401 |
| 7,921,706 | B2 | 4/2011 | Sumitani |
| 8,061,126 | B2 | 11/2011 | Gady et al. |
| 8,209,110 | B2 | 6/2012 | Weber et al. |
| 2003/0051468 | A1 | 3/2003 | Van Nieuwstadt et al. |
| 2004/0094138 | A1 | 5/2004 | Yasui et al. |
| 2004/0187482 | A1 | 9/2004 | Bidner et al. |
| 2004/0200208 | A1 | 10/2004 | Frank et al. |
| 2007/0137181 | A1 | 6/2007 | Upadhyay et al. |
| 2008/0022658 | A1 * | 1/2008 | Viola et al. ...................... 60/286 |

(Continued)

FOREIGN PATENT DOCUMENTS

| | | |
|---|---|---|
| WO | WO-2007/073324 | 6/2007 |
| WO | WO-2011/126429 | 10/2011 |

OTHER PUBLICATIONS

International Search Report and Written Opinion, PCT/2010/060805, Feb. 28, 2011, Cummins Filtration IP, Inc.

(Continued)

*Primary Examiner* — Thomas Denion
*Assistant Examiner* — Brandon Lee
(74) *Attorney, Agent, or Firm* — Foley & Lardner LLP

(57) ABSTRACT

Systems and methods are disclosed for diagnosing gain rationality of an NOx sensor that is downstream of a selective catalytic reduction (SCR) catalyst. Sensor diagnostics are performed while maintaining reductant dosing to the SCR catalyst.

20 Claims, 4 Drawing Sheets

(56) References Cited

U.S. PATENT DOCUMENTS

| | | |
|---|---|---|
| 2008/0271440 A1 | 11/2008 | Xu et al. |
| 2009/0165543 A1* | 7/2009 | Wakahara ............ G01M 15/102 73/114.61 |
| 2010/0043400 A1* | 2/2010 | Wang .................... F01N 3/2066 60/276 |
| 2011/0047964 A1 | 3/2011 | Yezerets et al. |
| 2011/0146240 A1 | 6/2011 | Wilhelm et al. |
| 2011/0219747 A1* | 9/2011 | Geveci et al. ................... 60/274 |
| 2012/0233986 A1 | 9/2012 | Geveci et al. |

OTHER PUBLICATIONS

European Search Report for European Patent Application No. 14170123.5, issued Oct. 15, 2015, 9 pages.

* cited by examiner

SYSTEMS AND METHODS FOR $NO_x$ SENSOR DIAGNOSTICS

TECHNICAL FIELD

The technical field generally relates to diagnostics for $NO_x$ sensors, and more particularly but not exclusively relates to systems and methods for diagnosing gain rationality of system-out $NO_x$ sensors in engine aftertreatment systems.

BACKGROUND

Modern internal combustion engines often utilize aftertreatment systems to achieve emissions regulatory targets. Some aftertreatment systems include an oxides of nitrogen ($NO_x$) reduction device, such as a catalyst for a selective catalytic reduction (SCR) system. Aftertreatment system control systems can be enhanced by detection of a failed or off-nominal $NO_x$ sensor. In some cases such detection is required by regulation. Detection of failed sensors can indicate that need to use an alternate $NO_x$ determination method and/or to set a failure indicator.

$NO_x$ sensors that are commercially viable for field use with an internal combustion engine have an interference with ammonia ($NH_3$), erroneously detecting a significant percentage (80% or higher) of $NH_3$ as $NO_x$. Further, reactions within the $NO_x$ reduction device cause a difference to occur from the $NO_x$-in to the $NO_x$-out that is not attributable to the sensors. Therefore, merely comparing sensor signals during engine operations will not generally allow a determination of a failed or off-nominal sensor. Furthermore, suspending the dosing of $NH_3$ or other reductant during a diagnostic of the $NO_x$ sensor results in the possibility of increased $NO_x$ emissions and increased doser tip temperatures. Therefore, further technological developments are desirable in this area.

SUMMARY

There is disclosed systems and methods for diagnostics of $NO_x$ sensors. In one aspect, the systems and methods include diagnosing gain rationality of system-out $NO_x$ sensors in engine aftertreatment systems that use catalysts with ammonia storage capacity. Further embodiments, forms, objects, features, advantages, aspects, and benefits shall become apparent from the following description and drawings.

DESCRIPTION OF THE ILLUSTRATIVE EMBODIMENTS

Figure 1:
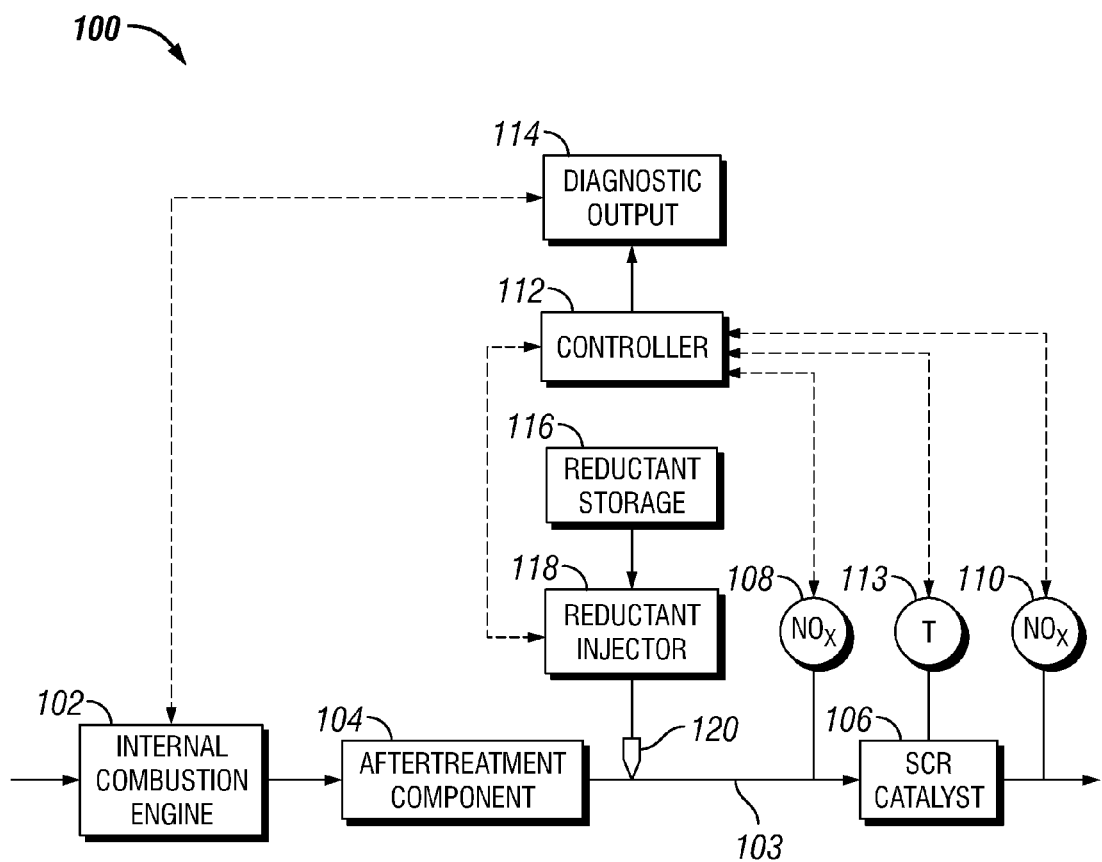
FIG. 1 is a schematic diagram of an engine and aftertreatment system with $NO_x$ sensor diagnostics.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of an exemplary system 100 that includes $NO_x$ sensor diagnostic capabilities to diagnose gain rationality of a system-out $NO_x$ sensor 110. The system 100 includes an internal combustion engine 102 producing an exhaust gas stream that is output in an exhaust path 103. The exhaust gas stream includes certain emissions that are treated by an aftertreatment component 104 and/or by an SCR catalyst 106. The system 100 also includes the capability to determine one or more temperatures of the SCR catalyst 106 and exhaust gas in exhaust path 103, which may include one or more temperature sensors 113 and/or temperature models. The temperature sensor 113 is indicated at a mid-bed location of the SCR catalyst 106 in FIG. 1, but the temperature sensor 113 or other temperature sensors may also be located upstream and/or downstream of the SCR catalyst 106. The SCR catalyst 106 temperature may further be modeled, in certain embodiments, for example from an upstream temperature in the exhaust gas stream.

The system 100 further includes a reductant storage unit 116 that supplies reductant to a reductant injector 118. The reductant injector 118 adds reductant to the exhaust stream at a position upstream of the SCR catalyst 106. In one embodiment, reductant injector 118 includes a doser tip 120 in the exhaust path 103 for delivering reductant to the exhaust gas stream. The reductant includes, for example, urea and/or ammonia, and the SCR catalyst 106 is configured to provide at least some ammonia storage capacity. The magnitude of the SCR catalyst 106 ammonia storage capacity is a function of the temperature of the SCR catalyst 106. It is known in the art that generally a lower temperature of the SCR catalyst 106 increases the ammonia storage capacity of the SCR catalyst 106.

The system 100 further includes a first or engine-out $NO_x$ sensor 108 upstream of the SCR catalyst 106 and a second or system-out $NO_x$ sensor 110 downstream of the SCR catalyst 106. The first $NO_x$ sensor 108 is illustrated at a position downstream of the reductant injector 118, but the first $NO_x$ sensor 108 may be positioned anywhere in the exhaust stream that is upstream of the SCR catalyst 106 and downstream of the internal combustion engine 102 to provide an engine-out $NO_x$ amount. In certain embodiments, injected urea hydrolyzes to ammonia in the exhaust stream and the first $NO_x$ sensor 108 reads ammonia at least partially as $NO_x$. Therefore, the first $NO_x$ sensor 108 may be positioned at a place within the exhaust stream where the urea is not expected to hydrolyze into gaseous phase detectable ammonia yet, for example at a position close to the reductant injector 118, or the first $NO_x$ sensor 108 may be positioned upstream of the reductant injector 118. In certain embodiments, the first $NO_x$ sensor 108 may be positioned where a portion or all of the injected reductant is expected to hydrolyze into ammonia, and the effect of the ammonia amount is estimated and subtracted from the first $NO_x$ sensor 108 indicated engine-out $NO_x$ amount. In certain embodiments, the first $NO_x$ sensor 108 is not sensitive to ammonia in the exhaust stream. Second $NO_x$ sensor 110 is located downstream of SCR catalyst 106 and provides an indication of a system-out $NO_x$ amount.

The system 100 may further include hardware that is not illustrated in FIG. 1, but that is nevertheless contemplated herein. Specifically, and without limitation, in certain embodiments the system 100 includes an oxidation catalyst, a turbocharger, an exhaust gas recirculation (EGR) loop, a hydrocarbon injector at a position upstream of the oxidation catalyst and/or aftertreatment component, and/or a common rail fuel system of the internal combustion engine capable of delivering unburned hydrocarbons or heat from very-late combustion to the exhaust stream. The addition or substitution of one or more of the described hardware is well known in the art, and such hardware is not described further except where specific operations or procedures herein utilize such hardware.

The system 100 includes a diagnostic output 114 that receives certain information or commands from a controller 112. The diagnostic output 114 may be a hardware device (e.g. a malfunction indicator lamp), a controller (separate from or combined with the controller 112 described herein—e.g. an engine, transmission, or aftertreatment controller), a datalink (e.g. receiving diagnostic data published for on-board diagnostic (OBD) purposes), or any other device known in the art.

The system includes the controller 112 that performs certain operations to diagnose system-out $NO_x$ sensor 110 gain rationality. In certain embodiments, the controller 112 forms a portion of a processing subsystem including one or more computing devices having memory, processing, and communication hardware. The controller 112 may be a single device or a distributed device, and the functions of the controller 112 may be performed by hardware or software. The controller 112 is in communication with any sensor, actuator, or component of the system 110 to perform the operations described herein. For example, in FIG. 1 controller 112 is in communications with sensors 108, 110, and 113. Controller 112 is also in communication with engine 102 and reductant injector 118. Communication may be direct, electronic, hard-wired, wireless, over a network, and/or over a datalink. The controller 112 may be a part of or in communication with an engine controller (not shown) and may determine engine operating parameters from the engine controller.

Figure 2:
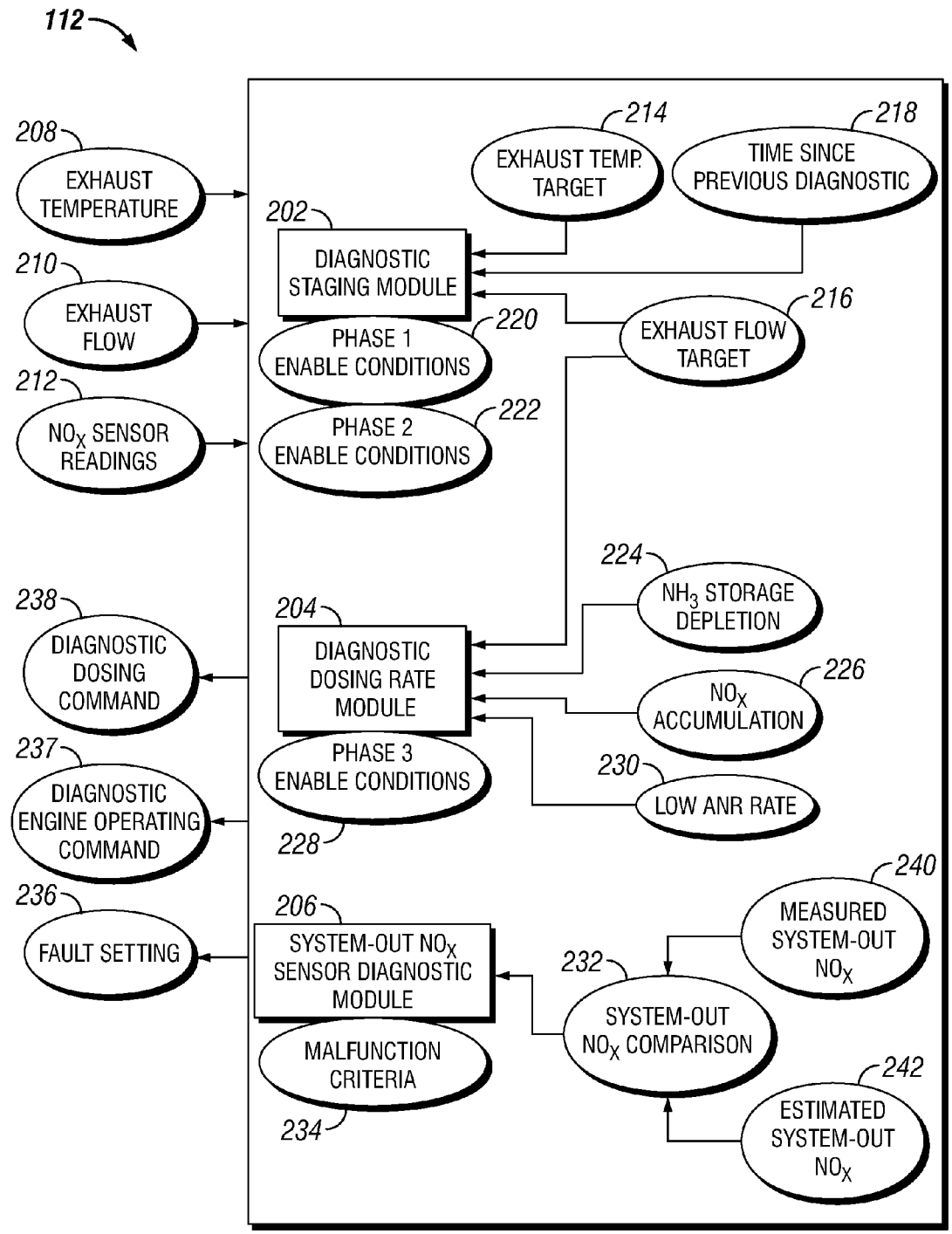
FIG. 2 is a schematic diagram of a controller for $NO_x$ sensor diagnostics.

In certain embodiments, such as shown in FIG. 2, the controller 112 includes one or more modules structured to functionally execute the operations of the controller. In certain embodiments, the controller includes a diagnostic staging module 202, a diagnostic dosing rate module 204, and a system-out $NO_x$ sensor diagnostic module 206. The diagnostic staging module 202 guides the operations of the controller through two phases of a diagnostic procedure, and further guides pausing, aborting or continuing the diagnostic procedure during the two phases. The diagnostic dosing rate module 204 sets a reductant dosing rate for a third phase of the diagnostic procedure and guides pausing, aborting or continuing the diagnostic procedure during the third phase of the diagnostic procedure. The diagnostic dosing rate module 204 further establishes a diagnostic engine operating command 237 in which engine 102 operates in a manner that reduces $NO_x$ production. The system-out $NO_x$ sensor diagnostic module 206 tests the system-out $NO_x$ sensor 210 for gain rationality and determines whether malfunction criteria has been met. The diagnostic output 114 is responsive to a fault setting 236 that is set by system-out $NO_x$ sensor diagnostic module 206 when malfunction criteria is met by system-out $NO_x$ sensor 110.

The description herein including modules emphasizes the structural independence of the aspects of the controller 112, and illustrates one grouping of operations and responsibilities of the controller 112. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

FIG. 2 is a schematic diagram of controller 112 that diagnoses system-out $NO_x$ sensor 110. The controller 112 includes diagnostic staging module 202, diagnostic dosing rate module 204, and system-out $NO_x$ sensor diagnostic module 206. The modules described are exemplary, and certain embodiments of the controller 112 may omit one or more modules or include one or more additional modules not specifically described herein.

Diagnostic staging module 202 guides the operations of the controller 112 through two phases of a diagnostic procedure, and further controls pausing, delaying, aborting, and/or continuing the diagnostic procedure during the two phases. The diagnostic staging module 202 uses any combination of sensors and actuators known in the art to perform the described operations, including at least providing commands to the engine 102, reductant injector 118, a turbocharger, a common rail fuel injection system, or any other hardware.

The diagnostic staging module 202 determines whether diagnostic conditions are enabled while reductant dosing is provided as during routine operation to, for example, maintain $NO_x$ emissions standards. In order to initiate phase one of the procedure, diagnostic staging module 202 determines whether exhaust temperature 208 satisfies an exhaust temperature target 214. The determination of whether the exhaust temperature 208 is within exhaust temperature target 214 can include a determination that the exhaust temperature is stable, above a minimum threshold, and/or below a maximum threshold. The exhaust temperature target 214 may be a temperature or temperature range selected to selected to allow negligible $NH_3$ storage in the SCR catalyst 106 and depletion of urea deposits. In certain catalyst formulations, a temperature of 500° C. is known to provide a very low $NH_3$ storage in the SCR catalyst 106. However, lower or higher temperature targets may be utilized for specific catalyst formulations as will be understood to one of skill in the art contemplating a particular catalyst for a particular embodiment of the system. If exhaust temperature target 214 is not satisfied, diagnostic staging module 202 determines phase 1 enable conditions 220 are not met and the sensor diagnostic is aborted until phase 1 enable conditions 220 are met by the exhaust temperature.

Diagnostic staging module 202 further receives exhaust flow input 210. During phase one operation, diagnostic staging module 202 determines if various conditions satisfy phase two enable conditions 222. One operating condition includes determining if exhaust flow input 210 satisfies an exhaust flow target 216. The determination of whether the exhaust flow 210 is within exhaust flow target 216 can include a determination that the exhaust flow is stable, above a minimum threshold, and/or below a maximum threshold. In one embodiment, the exhaust flow target 216 can be selected as a minimum exhaust flow that prevents formation of urea deposits. Furthermore, diagnostic staging module 202 determines a time since previous diagnostic 218 to ensure a predetermined amount of time has passed since the previous system-out $NO_x$ sensor diagnostic was performed. Diagnostic staging module 202 determines phase two enable conditions 222 are satisfied if each of the exhaust temperature target 214, the exhaust flow target 216, and time since previous diagnostic 218 are met. In one or more of these conditions is not met, phase two enable conditions 222 are not satisfied and the sensor diagnostic procedure is aborted.

When phase two enable conditions are met, controller 112 continues operation with diagnostic dosing module 204.

Diagnostic dosing module 204 guides the operations of the controller 112 through the second phase of the diagnostic procedure, and further controls pausing, delaying, aborting, and/or continuing the diagnostic procedure during the second phase while providing reductant dosing to SCR catalyst 106. The diagnostic dosing module 204 uses any combination of sensors and actuators known in the art to perform the described operations, including at least providing commands to the engine 102, a reductant injector 118, a turbocharger, a common rail fuel injection system, or any other hardware.

Dosing rate module 204 establishes a low ANR (ammonia to $NO_x$ ratio) rate 230 based on engine-out $NO_x$ amounts from first $NO_x$ sensor 108. The low ANR rate 230 is interpreted as a diagnostic dosing command 238 by diagnostic dosing rate module 204 for reductant dosing during the second phase that allows at least some $NO_x$ reduction during the diagnostic procedure, while minimizing effects of SCR efficiency on $NO_x$ sensor gain error. Low ANR rate 230 is defined as an ANR rate that is substantially less than a stoichiometric ANR rate for treatment of $NO_x$ emissions. In one embodiment the low ANR rate is more than 0 but less than 0.5.

Figure 3:
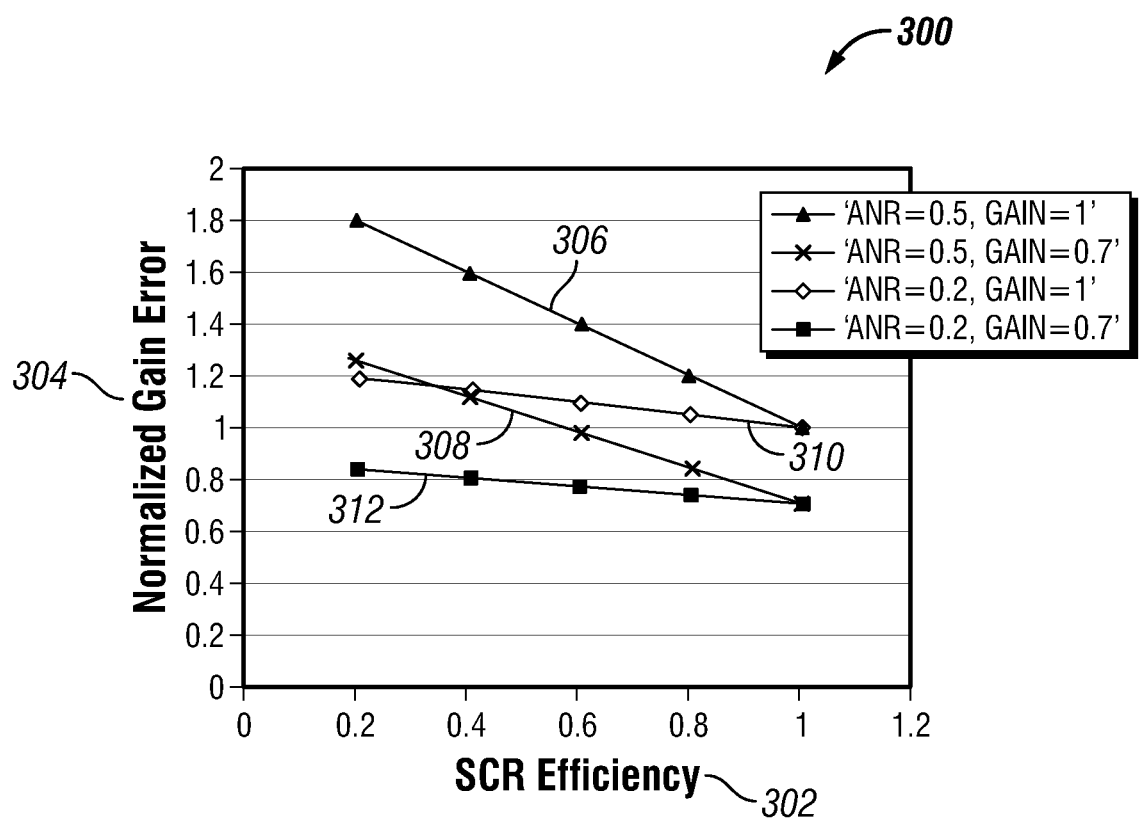
FIG. 3 is an illustration of the effect of SCR catalyst efficiency on sensor gain error for various ANR levels.

FIG. 3 includes a graph 300 that illustrates the effect of SCR efficiency 302 along the X-axis on normalized gain error 304 along the Y-axis. Lines 306, 308 represent an ANR rate of 0.5 for normalized gain errors 304 of 1.0 and 0.7, respectively, at an SCR efficiency of 1.0 (100% efficiency.) At low SCR efficiencies, the effects on the normalized gain error 304 is significant when the ANR rate is 0.5. For example, with an SCR efficiency of 0.2, an ANR rate of 0.5 causes about an 80% deviation in the normalized gain error from the gain error determined with an SCR catalyst operating at 100% efficiency.

In contrast, SCR efficiency 302 has a substantially smaller impact on the normalized gain error 304 at low ANR rates. Lines 310, 312 represent an ANR rate of 0.2 for normalized gain errors 304 of 1.0 and 0.7, respectively. At low SCR efficiencies, the effects on the normalized gain error 304 is minimal with the low ANR rate of 0.2. For example, with an SCR efficiency of 0.2, an ANR rate of 0.2 causes about a 20% deviation in the normalized gain error from the gain error 304 determined with an SCR catalyst operating at 100% efficiency. Accordingly, diagnostic dosing rate module 204 sets a low ANR rate 230 for reductant dosing at the diagnostic dosing command 238 to minimize the impact of SCR efficiency in determining the gain error of system-out $NO_x$ sensor 110. In one specific embodiment, the low ANR rate 230 is 0.2. In yet another embodiment, the low ANR rate 230 is less than 0.5.

The low ANR rate 230 establishes a reductant dosing command 238 that to reductant injector 118 to provide reductant to exhaust path 103 during the diagnostic procedure. Providing reductant while performing the diagnostic procedure mitigates NOx emissions and provides cooling of the doser tip 120 in exhaust path 103. In addition, urea crystallization is prevented since reductant dosing is not terminated during the diagnostic procedure.

In order to further reduce the $NO_x$ emission impact at tailpipe during the e diagnostic, controller 112 controls operation of engine 102 to operate according to diagnostic engine operating command 237 in which NOx production from engine 102 is reduced. Reduction of $NO_x$ output from engine 102 during the diagnostic allows the diagnostic to be performed more often with less emissions impact. In one specific example, diagnostic engine operating command 238 causes engine 102 to operate in a manner that produces 70% less $NO_x$ than when operating in its normal operating mode. As a result, the $NO_x$ emissions during the diagnostic are reduced substantially from a diagnostic performed when engine 102 is maintained in its current, normal operating mode.

While providing reductant dosing at dosing command 238, diagnostic dosing rate module 204 further determines that exhaust flow 210 continues to meet exhaust flow target 216. In addition, an $NH_3$ storage depletion time 224 is determined for depletion of ammonia storage on SCR catalyst 106 and urea deposits according to the exhaust temperature 208 and exhaust flow 210. When $NH_3$ storage depletion time 224 and exhaust flow target 216 are satisfied, phase three enable conditions 228 are met and controller 112 turns operation to system-out $NO_x$ sensor diagnostic module 206.

Controller 112 monitors an $NO_x$ accumulation 226 during the second phase and the third phase of the diagnostic procedure. Controller 112 is configured to abort the diagnostic procedure during phases two and three if NOx accumulation 226 exceeds a threshold. The NOx accumulation threshold can be established to, for example, prevent regulatory violations or otherwise exceeding an unacceptable amount of $NO_x$ emissions during the diagnostic procedure. Other abort conditions can be monitored by controller 112 during the diagnostic procedure which if met would enable abort conditions. Examples include systems and/or component errors which might cause an incorrect diagnostic.

If controller 112 determines phase three conditions 228 are enabled and diagnostic procedure abort conditions are not met, controller 112 continues operation with system-out $NO_x$ sensor diagnostic module 206 performing the third phase of the procedure. While maintaining reductant dosing with dosing command 238 to provide at least some treatment of $NO_x$ emissions, a measured system-out $NO_x$ 240 is determined by controller 112 from second $NO_x$ sensor 110. In addition, an estimated of system-out $NO_x$ 242 is determined by controller 112. The measured system-out $NO_x$ 240 and estimated of system-out $NO_x$ 242 are subject to a system-out $NO_x$ comparison 232 with system-out $NO_x$ sensor diagnostic module 206. The estimate of system-out $NO_x$ 240 can be determined by the following formula:

$$ESONO_x = EONO_x * (1 - ANR * SCREFF) \quad \text{(Equation 1)}$$

In Equation 1, $EONO_x$ is the engine-out $NO_x$ determined by first $NO_x$ sensor 108; ANR is the low ANR rate 230 determined by diagnostic dosing rate module 204; and SCREFF is the efficiency of the SCR catalyst 106. SCR catalyst efficiency is the operating efficiency of SCR catalyst 106 in removing $NO_x$ emissions with a stoichiometric dosing rate of reductant. Since a low ANR rate 230 is used for diagnostic dosing command 238, SCR catalyst efficiency has minimal impact on the gain error determination and can be assumed to be 100% due to depletion of ammonia storage and urea deposits. Alternatively, the SCR efficiency can be assumed to be any reasonable value, or based on one or more previous determinations of SCR efficiency by controller 112. The proposed systems and methods minimize the impact of noise sources of SCR performance and ammonia storage effect to improve diagnostic accuracy. Since a small amount of reductant dosing is maintained during the diagnostic, urea crystallization is avoided and the temperature of doser tip 120 is reduced to improve the life of doser tip 120.

The system-out $NO_x$ comparison 232 includes determining the gain error of system-out $NO_x$ sensor 210 by dividing the measured system-out $NO_x$ 240 with the estimated system-out $NO_x$ 242.

$$\text{Gain error} = \text{Measured } SONO_x / \text{Estimated } SONO_x \quad \text{(Equation 2)}$$

Measured $SONO_x$ is the system-out $NO_x$ measured by system-out $NO_x$ sensor 110 and the Estimated $SONO_x$ is determined as discussed above. $NO_x$ sensor diagnostic module 206 further includes malfunction criteria 234 that determine when a fault condition is established for system-out $NO_x$ sensor 110 by system-out $NO_x$ comparison 232. Malfunction criteria 234 can include the sensor gain error lying outside a predetermined threshold or range. In one example, a sensor fault is determined if the gain error is less than 0.7. Other ranges are also contemplated. The sensor fault thresholds for malfunction criteria 234 can vary depending on desired sensitivity, operating characteristics of the sensors, operating conditions of engine and/or aftertreatment system, and other factors. Malfunction criteria 234 may also include a statistical analysis of a number of gain error determinations indicating the system-out $NO_x$ sensor 110 is providing measurements outside of predetermined criteria for a properly functioning system-out $NO_x$ sensor 110. If system-out $NO_x$ sensor 110 is not functioning properly as indicated by the determination of the gain error the controller 112 determines a fault setting 236 that can be output and displayed on diagnostic output 114.

An exemplary procedure 400 to diagnose a $NO_x$ sensor is described with reference to FIG. 4 and further above with respect to controller 112. The technique includes operations to diagnose the system-out $NO_x$ sensor 110. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 4:
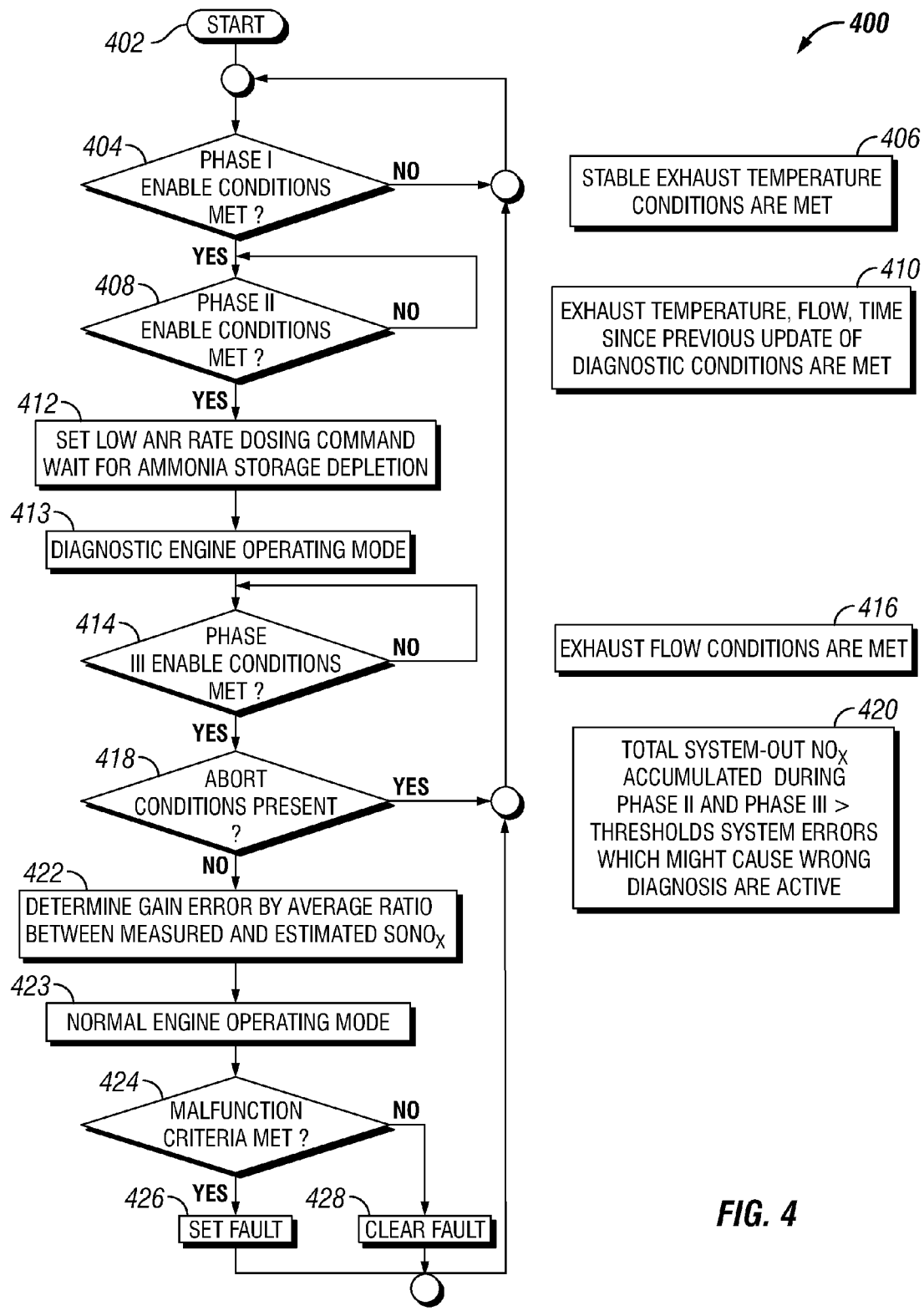
FIG. 4 is a schematic flow diagram of a $NO_x$ sensor diagnostic procedure.

FIG. 4 is a flow diagram of a diagnostic procedure 400. Procedure 400 is initiated at 402 upon, for example, starting of engine 102. Procedure 400 includes three phases of operation as discussed above with respect to controller 112. As used herein, a phase is a portion of procedure 400 or operation of controller 112 where certain enable conditions are met by system 100 before the phase is initiated. While procedure 400 is described with reference to three phases, more or fewer phases are contemplated. For example operations of controller 112 and/or procedure 400 may be completed in a single phase, two phases, or four or more phases.

With respect to the illustrated embodiment of procedure 400, phase one enable conditional 404 of the diagnostic procedure 400 is associated with an operation 406 to determine exhaust temperature stability conditions. If the exhaust temperatures determined at operation 406 are not stable and/or meet a predetermined exhaust temperature target, then phase one enable conditional 404 is not met and procedure 400 returns to continue to monitor phase one enable conditions. If phase one enable conditional 404 is satisfied, procedure 400 continues into a first phase of operation. During the first phase, the normal dosing of reductant by the reductant injector 118 is performed.

Phase one of procedure 400 includes a phase two enable conditional 408 that is associated with an operation 410. Operation 410 determines operating conditions such as exhaust temperature conditions and the exhaust flow conditions. Operation 410 also includes determining a time elapsed since the previous update of diagnostic conditions of system-out $NO_x$ sensor 110 to, for example, prevent procedure 400 from being performed too often. If the determinations at operation 410 indicate that phase two enable conditional 408 is not satisfied, procedure 400 continues to monitor conditions at operation 410 until phase two enable conditional 408 is satisfied.

If phase two enable conditional 408 is satisfied, procedure 400 initiates phase two of procedure 400 at operation 412. Operation 412 sets a diagnostic dosing command 238 that corresponds to the low ANR rate 230 discussed above. Operation 412 also includes establishing a waiting period for ammonia storage and urea deposit depletion at the dosing rate. The total time for the waiting period of operation 412 can, for example, be based on the temperature of the SCR catalyst 106 and the flow rate of exhaust gas through the SCR catalyst 106. The temperature and time values required to drive the $NH_3$ storage and urea deposits to acceptably low levels is readily determined by one of skill in the art with a routine data check on SCR catalyst 106.

After operation 412, procedure 400 continues at operation 413 which sets engine 102 in a diagnostic engine operating mode. The diagnostic engine operating mode causes engine 102 to operate in a manner in which engine out NOx production is lowered, such as discussed above with respect to diagnostic engine operating command 237.

After operation 413, procedure 400 continues at a phase three enabled conditional 414. The determination that phase three conditions are enabled includes an operation 416 to determine that exhaust flow conditions are met. If exhaust flow conditions are not met, procedure 400 continues to monitor exhaust flow conditions until phase three enable conditional 414 is met.

When the phase three enable conditional 414 is satisfied at conditional 414, procedure 400 continues with phase three operation. Abort conditional present conditional 418 determines if abort conditions are present during phases two and three of procedure 400. The determination of whether abort conditions present conditional 418 is satisfied with an operation 420 which determines whether the system-out $NO_x$ accumulated during phase one and phase two is greater than a predetermined threshold. Operation 420 may also consider other system errors, such as other sensor or component diagnostics indicating faulty conditions, are present which may provide an incorrect diagnostic of system-out $NO_x$ sensor 110. If abort conditions present conditional 418 is satisfied, procedure 400 aborts and returns to conditional 404.

If abort conditions present conditional 418 is not satisfied, procedure 400 continues in phase three at operation 422 in which the gain error of system-out $NO_x$ sensor 110 is determined by the ratio of the measured system-out $NO_x$ to the estimated system-out $NO_x$ or the average ratio over a diagnostic time period. The diagnostic time period can be selectable and/or variable and range from a several milliseconds to a few seconds of time. After the diagnostic time period is complete, procedure 400 continues at operation 423 to return engine 102 to a normal operating mode. Engine 102 also returns to normal operating mode if abort conditions are present or procedure 400 is otherwise terminated.

Procedure 400 continues at conditional 424 to determine whether malfunction criteria are met by the gain error determined at operation 422. If the malfunction criteria 424 indicates a fault by the gain error of system-out $NO_x$ sensor 110, a fault is set at operation 426. If the malfunction criteria 424 indicates no fault is indicated by the gain error of system-out $NO_x$ sensor 110, a clear fault is set at operation 428. The gain error determinations of system-out NOx sensor 110 may be incremented or decremented towards a fault condition, or a fault condition may be set or cleared based on a single diagnostic execution. Any fault logic understood in the art is contemplated herein. After execution of one of operations 426, 428, procedure 400 returns to conditional 404 to determine if phase one conditions are enabled for another diagnosis of system-out $NO_x$ sensor 110.

The diagnostic procedure 400 may be performed continuously, at regular intervals, or at irregular intervals by controller 112. For example, diagnostic procedure 400 can be performed after each aftertreatment component regeneration event, once per operation of the vehicle or other platform for the system, or be selectively performed by any other selection logic understood in the art. Certain phases may be executed for any purpose, and/or completed under varying, alternate, or additional conditions from those listed. The emissions threshold for accumulated $NO_x$ 226 may be selected according to the emissions impact requirement of the particular system, or for any other reason understood in the art. The emissions impact requirement varies according to any parameters understood in the art, including at least the certification levels of the engine, the role of the aftertreatment system in achieving the certification levels, and the required or negotiated emissions effects of the diagnostic procedure.

As is evident from the figures and text presented above, a variety of aspects of the systems and methods disclosed herein are contemplated. In one aspect, a method includes setting a diagnostic dosing command for injection of reductant at an ANR rate that is substantially less than a stoichiometric ANR rate and depleting reductant deposits and reductant storage of a selective catalytic reduction (SCR) catalyst with exhaust gas from an internal combustion engine while injecting reductant into the exhaust gas upstream of the SCR catalyst according to the diagnostic dosing command. The method also includes, while providing reductant to the SCR catalyst at the reductant dosing command and after depleting reductant storage with the exhaust gas, determining an engine-out $NO_x$ amount; determining an estimated system-out $NO_x$ amount from the engine-out $NO_x$ amount and the ANR rate; comparing a measured system-out $NO_x$ amount from a system-out $NO_x$ sensor downstream of the SCR catalyst with the estimated system-out $NO_x$ amount; and determining a fault condition of the system-out $NO_x$ sensor in response to the comparing.

In one embodiment, before setting the diagnostic doser command, the method includes determining a temperature of the exhaust gas meets an exhaust gas temperature target. In one refinement, before setting the diagnostic doser command, the method also includes determining a flow of the exhaust gas meets an exhaust gas flow target. In yet a further refinement, the exhaust gas temperature target and the exhaust gas flow target each include a minimum threshold.

In another embodiment, before determining the estimated system-out $NO_x$ amount, the method includes determining whether the internal combustion engine is producing greater than a threshold amount of accumulated $NO_x$, and in response to the engine producing greater than the threshold amount of accumulated $NO_x$ aborting determining the fault condition.

In yet another embodiment, the ANR rate is between 0.1 and 0.3. In another embodiment, the ANR rate is about 0.2. In yet a further embodiment, comparing the measured system-out $NO_x$ amount with the estimated system-out $NO_x$ amount includes determining a gain error from a ratio of the measured system-out $NO_x$ amount to the estimated system-out $NO_x$ amount. In a refinement of this embodiment, determining the fault condition of the system-out $NO_x$ sensor includes setting a fault if the gain error is less than 0.7.

According to another aspect, a method includes meeting phase one conditions of a system-out $NO_x$ sensor diagnostic procedure by determining an exhaust gas temperature of an exhaust gas produced by an internal combustion engine satisfies an exhaust gas temperature target while injecting a reductant into the exhaust gas so that a SCR catalyst receiving the exhaust gas operates to meet $NO_x$ emissions criteria. After meeting phase one conditions, the method includes meeting phase two conditions of the diagnostic procedure by determining the exhaust gas temperature satisfies the exhaust gas temperature target and an exhaust gas flow of the exhaust gas satisfies an exhaust gas flow target. After meeting phase two conditions, the method includes determining a diagnostic dosing command in response to an ANR rate that is less than a stoichiometric ANR rate and depleting reductant storage of the SCR catalyst with the exhaust gas from the internal combustion engine while injecting reductant into the exhaust gas according to the diagnostic dosing command. After depleting reductant storage of the SCR catalyst, the method includes meeting phase three conditions of the diagnostic procedure by determining the exhaust gas flow satisfies the exhaust gas flow target. After meeting phase three conditions, the method includes determining a gain error of a system-out $NO_x$ sensor located downstream of the SCR catalyst while injecting reductant into the exhaust gas according to the diagnostic dosing command and determining a fault condition of the system-out $NO_x$ sensor in response to the comparing.

In one embodiment, determining the gain error includes comparing a measured system-out $NO_x$ amount from the system-out $NO_x$ sensor with an estimated system-out $NO_x$ amount. In a refinement of this embodiment, the estimated system-out $NO_x$ amount is determined from an engine-out $NO_x$ amount and the ANR rate.

In another embodiment, determining the gain error includes determining an average ratio of a measured system-out $NO_x$ amount from the system-out $NO_x$ sensor to an estimated system-out $NO_x$ amount over a time period. In yet another embodiment, determining the diagnostic dosing command includes setting the diagnostic dosing command to an ANR rate that is less than 0.5. In a further embodiment, determining the diagnostic dosing command includes setting the diagnostic dosing command at an ANR rate that is about 0.2. In yet another embodiment, determining the fault condition of the system-out $NO_x$ sensor includes setting a fault if the gain error is less than 0.7.

In another embodiment, the method includes determining whether the internal combustion engine has produced greater than a threshold amount of accumulated $NO_x$, during phase two and phase three and in response to the engine producing greater than the threshold amount of accumulated $NO_x$ aborting determining the fault condition. In yet another embodiment, depleting reductant storage includes depleting reductant deposits.

In another aspect, a system includes an internal combustion engine operable to produce an exhaust gas and an exhaust path connected to the internal combustion engine. The exhaust path includes a SCR catalyst and a system-out $NO_x$ sensor downstream of the SCR catalyst. The system also includes a reductant system that has a reductant storage tank and a reductant injector connected to the reductant storage tank that is configured to receive reductant from the reductant storage tank and supply reductant to the exhaust path upstream of the SCR catalyst. The system also includes a controller. The controller includes a diagnostic staging module configured to determine a temperature of the exhaust gas satisfies an exhaust gas temperature target and to determine a flow of the exhaust gas satisfies an exhaust gas flow target. The controller further includes a diagnostic dosing rate module configured to provide a diagnostic dosing command to the reductant injector according to an ANR rate that is substantially less than a stoichiometric ANR rate when the exhaust gas temperature and exhaust gas flow targets are satisfied. The diagnostic dosing rate module is further configured to provide the diagnostic dosing command to inject reductant during depletion of reductant in the exhaust path with the exhaust gas. The controller further includes a system-out $NO_x$ sensor diagnostic module configured to, after depletion of the reductant, compare a measured system-out $NO_x$ amount from the system-out $NO_x$ sensor with an estimated system-out $NO_x$ and to provide a fault setting for the system-out $NO_x$ sensor in response to the comparison.

In one embodiment, the system-out $NO_x$ sensor diagnostic module is configured to determine a gain error of the system-out $NO_x$ sensor from a ratio of the measured system-out $NO_x$ amount to the estimated system-out $NO_x$ amount. In a refinement of this embodiment, the system-out $NO_x$ sensor diagnostic module is configured to determine the estimated system-out $NO_x$ amount from a measurement of an engine-out $NO_x$ amount by a sensor upstream of the SCR catalyst and the ANR rate.

In another embodiment, the reductant system includes a closer tip in the exhaust path that is connected to the reductant injector. In yet another embodiment, the system-out $NO_x$ sensor diagnostic module is further configured to provide the fault setting to a diagnostic output device. In a refinement of this embodiment, the diagnostic output device comprises a device selected from the devices consisting of a malfunction indicator lamp, an engine controller, an aftertreatment controller, and a datalink.

In another embodiment, a method includes operating an internal combustion engine in a first mode that produces exhaust gas with oxides of nitrogen ($NO_x$) into an exhaust system including a selective catalytic reduction (SCR) catalyst; setting a diagnostic dosing command for injection of a reductant into the exhaust system at an ammonia to $NO_x$ ratio (ANR) rate that is substantially less than a stoichiometric ANR rate; operating the internal combustion engine in a second mode in which NOx production is substantially reduced from the first mode while injecting reductant into the exhaust gas upstream of the SCR catalyst according to the diagnostic dosing command; and determining a fault condition of a system-out $NO_x$ sensor downstream of the SCR catalyst while operating the internal combustion engine in the second mode and injecting reductant according to the diagnostic dosing command.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    setting a diagnostic dosing command for injection of reductant at an ammonia to oxides of nitrogen (NOx) ratio (ANR) rate that is less than a stoichiometric ANR rate;
    injecting reductant in response to the diagnostic dosing command;
    determining a reductant depletion time based on a temperature of a selective catalytic reduction (SCR) catalyst and a flow rate of an exhaust gas;
    depleting reductant deposits and reductant storage the SCR catalyst with the exhaust gas from an internal combustion engine for the determined reductant depletion time;
    determining an estimated system-out NOx amount based on a measured engine-out NOx amount upstream of the SCR catalyst and the ANR rate;
    determining a measured system-out NOx amount from a system-out NOx sensor downstream of the SCR catalyst;
    determining a gain error for the system-out NOx sensor based on a ratio of the measured system-out NOx amount to the estimated system-out NOx amount;
    determining a fault condition of the system-out NOx sensor based on the gain error; and
    providing the fault condition to a malfunction indicator means.

2. The method of claim 1 further comprising:
    determining a temperature of the exhaust gas meets an exhaust gas temperature target before setting the diagnostic dosing command.

3. The method of claim 2 further comprising:
    determining a flow of the exhaust gas meets an exhaust gas flow target before setting the diagnostic dosing command.

4. The method of claim 3, wherein the exhaust gas temperature target and the exhaust gas flow target each include a minimum threshold.

5. The method of claim 1 further comprising:
    determining whether the internal combustion engine is producing greater than a threshold amount of accumulated NO before determining the estimated system-out $NO_x$ amount, and
    aborting determining the fault condition responsive to the engine producing greater than the threshold amount of accumulated $NO_x$.

6. The method of claim 1, wherein the ANR rate is between 0.1 and 0.3.

7. The method of claim 1, wherein the ANR rate is about 0.2.

8. The method of claim 1, wherein determining the fault condition of the system-out $NO_x$ sensor includes setting a fault if the gain error is less than 0.7.

9. A method, comprising:
    determining an exhaust gas temperature of an exhaust gas produced by an internal combustion engine satisfies an exhaust gas temperature target while injecting a reductant into the exhaust gas so that a selective catalytic reduction (SCR) catalyst receiving the exhaust gas operates to meet an oxides of nitrogen (NOx) emissions criteria;
    determining an exhaust gas flow of the exhaust gas satisfies an exhaust gas flow target;
    determining a diagnostic dosing command in response to an ammonia to NOx ratio (ANR) rate that is less than a stoichiometric ANR rate;
    determining a reductant depletion time based on a temperature of the SCR catalyst and a flow rate of the exhaust gas;
    depleting reductant storage of the SCR catalyst with the exhaust gas from the internal combustion engine while injecting reductant into the exhaust gas according to the diagnostic dosing command, the depletion of reductant storage based on the reductant depletion time;
    determining a gain error of a system-out NOx sensor located downstream of the SCR catalyst while injecting reductant into the exhaust gas according to the diagnostic dosing command based on a ratio of a measured system-out NOx amount measured by the system-out NOx sensor to an estimated system-out NOx amount based on a measured engine-out NOx amount upstream of the SCR catalyst and the ANR rate;
providing a fault setting indicative of a fault condition of the system-out NOx sensor based on the determined gain error; and
providing the fault setting to a malfunction indicator means.

10. The method of claim 9, wherein determining the gain error includes determining an average ratio of the measured system-out $NO_x$ amount from the system-out $NO_x$ sensor to the estimated system-out $NO_x$ amount over a time period.

11. The method of claim 9, wherein determining the diagnostic dosing command includes setting the diagnostic dosing command to an ANR rate that is less than 0.5.

12. The method of claim 9, wherein determining the diagnostic dosing command includes setting the diagnostic dosing command at an ANR rate that is about 0.2.

13. The method of claim 9, wherein the fault setting indicative of the fault condition of the system-out $NO_x$ sensor is provided if the gain error is less than 0.7.

14. The method of claim 9, further comprising
determining whether the internal combustion engine has produced greater than a threshold amount of accumulated $NO_x$; and
aborting determining the fault condition responsive to the engine producing greater than the threshold amount of accumulated $NO_x$.

15. The method of claim 9, wherein depleting reductant storage includes depleting reductant deposits.

16. A system, comprising:
an internal combustion engine operable to produce an exhaust gas;
an exhaust path connected to the internal combustion engine, the exhaust path including a selective catalytic reduction (SCR) catalyst and a system-out oxide of nitrogen (NOx) sensor downstream of the SCR catalyst;
a reductant system including a reductant storage tank and a reductant injector connected to the reductant storage tank, the reductant injector configured to receive reductant from the reductant storage tank and supply reductant to the exhaust path upstream of the SCR catalyst;
a malfunction indicator means; and
an electronic controller, including:
a diagnostic staging module configured to determine a temperature of the exhaust gas satisfies an exhaust gas temperature target and to determine a flow of the exhaust gas satisfies an exhaust gas flow target;
a diagnostic dosing rate module configured to provide a diagnostic dosing command to the reductant injector according to an ammonia to NOx ratio (ANR) rate that is less than a stoichiometric ANR rate when the exhaust gas temperature and exhaust gas flow targets are satisfied and to determine a reductant depletion time based on a temperature of the SCR catalyst and a flow rate of the exhaust gas, wherein the diagnostic dosing rate module is further configured to provide the diagnostic dosing command to inject reductant during depletion of to deplete reductant in the exhaust path with the exhaust gas for the determined reductant depletion time; and
a system-out NOx sensor diagnostic module configured to, after depletion of the reductant, determine a gain error for the system out NOx sensor based on a ratio of a measured system-out NOx amount from the system-out NOx sensor to an estimated system-out NOx based on a measured engine-out NOx amount upstream of the SCR catalyst and the ANR rate and to provide a fault setting for the system-out NOx sensor to the malfunction indicator means in response to the determined gain error being below a threshold value.

17. The system of claim 16, wherein measured engine-out $NO_x$ amount is from a sensor upstream of the SCR catalyst.

18. The system of claim 16, wherein the reductant system includes a doser tip in the exhaust path that is connected to the reductant injector.

19. A method, comprising:
operating an internal combustion engine in a first mode that produces exhaust gas with oxides of nitrogen (NOx) into an exhaust system including a selective catalytic reduction (SCR) catalyst;
setting a diagnostic dosing command for injection of a reductant into the exhaust system at an ammonia to NOx ratio (ANR) rate that is less than a stoichiometric ANR rate;
operating the internal combustion engine in a second mode in which NOx production is reduced from the first mode while injecting reductant into the exhaust gas upstream of the SCR catalyst according to the diagnostic dosing command to produce exhaust gas with an ammonia to NOx ratio in the exhaust system based on the ANR rate;
determining a reductant depletion time based on a temperature of the SCR catalyst and a flow rate of an exhaust gas;
injecting reductant at the diagnostic dosing command to deplete reductant deposits and reductant storage of the SCR catalyst with the exhaust gas from an internal combustion engine for the determined reductant depletion time;
determining a fault condition of a system-out NOx sensor downstream of the SCR catalyst while operating the internal combustion engine in the second mode and injecting reductant according to the diagnostic dosing command, wherein determining the fault condition includes determining a gain error for the system out NOx sensor based on a ratio of a measured system-out NOx amount from the system-out NOx sensor to an estimated system-out NOx based on a measured engine-out NOx amount upstream of the SCR catalyst and the ANR rate; and
providing a fault setting indicative of the determined fault condition of the system-out NOx sensor to a malfunction indicator means based on the determined gain error.

20. The system of claim 16, wherein the threshold value is approximately 0.7.

* * * * *